INVENTORS
KURT WEIDINGER
ADOLF KALBERLAH

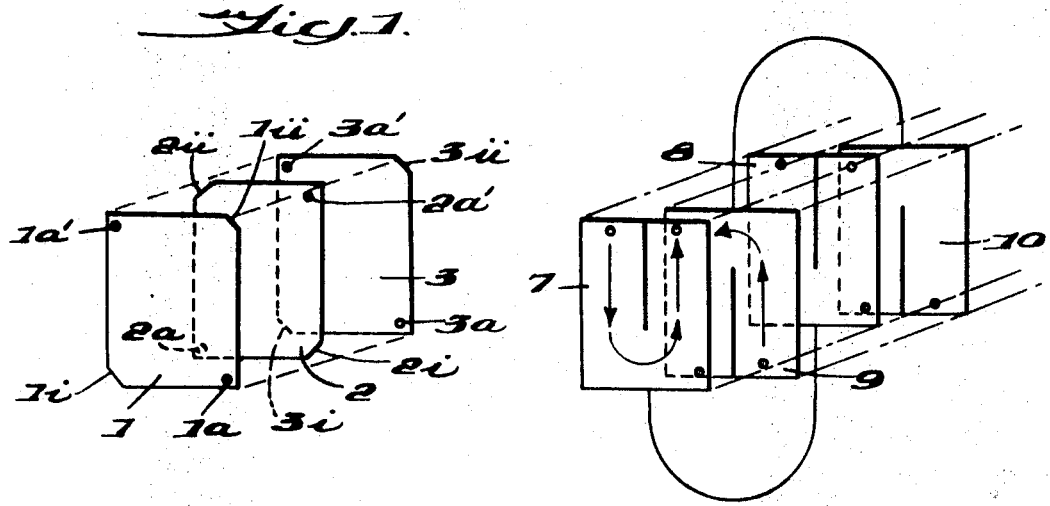
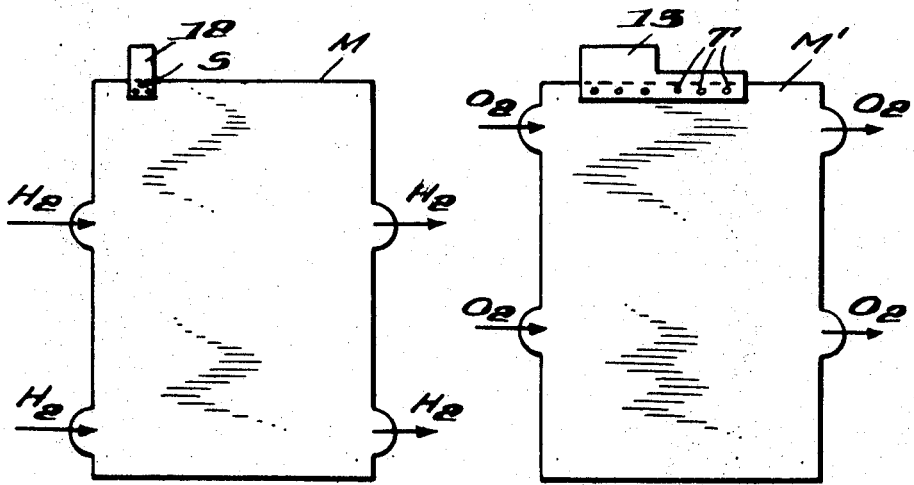

BY Stephens, Huettig and O'Connell
ATTORNEYS

April 27, 1971 K. WEIDINGER ET AL 3,576,732
CAST ELECTRICAL BATTERIES AND PROCESS FOR THEIR PRODUCTION
Filed Feb. 16, 1968 3 Sheets-Sheet 3

INVENTORS
KURT WEIDINGER,
ADOLF KALBERLAH,

BY Stephens, Huettig and
O'Connell ATTORNEYS

United States Patent Office 3,576,732
Patented Apr. 27, 1971

3,576,732
CAST ELECTRICAL BATTERIES AND PROCESS
FOR THEIR PRODUCTION
Kurt Weidinger, Friedrichsdorf, and Adolf Kalberlah, Braunschweig, Germany, assignors to Varta Aktiengesellschaft, Frankfurt am Main, Germany
Filed Feb. 16, 1968, Ser. No. 706,102
Claims priority, application Germany, Feb. 18, 1967, V 33,005
Int. Cl. B01k 3/00; H01m 27/00
U.S. Cl. 204—258
16 Claims

ABSTRACT OF THE DISCLOSURE

An electrical device for the production or use of electrical energy which has a cast casing enclosing a plurality of positive and negative gas diffusion electrodes compactly arranged in an alternating sequence of polarity and in such a way that a portion of the surfaces of all of the electrodes of one, or of both, polarities project on at least one side of the arranged electrodes in a uniform manner beyond recessed surfaces of all of the electrodes of the opposite polarity. The casing is cast from synthetic resin and has continuous electrolyte supply canal means therein for supplying electrolyte to, and removing electrolyte from, the electrodes; the casing also has holes for supplying operating gas to and removing such gas from, the electrodes.

Process for fabricating the electrical device which includes compactly arranging the electrodes with removable spacing elements and cores therebetween, casting the resulting compact structure in a suitable casting resin, removing the spacing elements and cores to provide internal electrolyte chambers and conduits and then drilling holes through the casing and into the electrodes to provide gas inlet and exit openings for operating gases.

BACKGROUND OF THE INVENTION (1) Field of the invention

The invention relates to fuel cell batteries which employ gas diffusion electrodes therein for the generation or consumption of electrical energy in electrochemical processes.

(2) Description of the prior art

It has already been proposed by those in the art to enclose gas diffusion electrodes which have one working side or surface with a synthetic resin coating. Electrodes of this type mainly consist of two layers, one fine pored and one coarse pored. The coarse pored layer is a catalytically active layer for consuming the operating gas and in most applications the fine pored covered layers are used to keep the electrolyte from entering the gas chamber. In electrolysis applications, however, the fine pored layer can be used for feeding electrolytes to the coarse pored layer which serves as a gas generating chamber. In other applications wherein a gas is to be generated catalytically in the gas generating layer of the electrode, a solution of a hydrogen gas precursor, for example, such as hydrazine or alkali metal borohydride is mixed with a suitable fluid and the mixture is forced through the fine pored cover layers of the electrode into the inner coarse pored gas generating chamber. Electrodes of this type are generally used back-to-back in pairs and each pair of electrodes is then enclosed in a synthetic resin coating, through which individual holes are drilled from the outside in order to provide egress means for gas generated in the common gas generating layer of the two electrodes. By arranging a plurality of individual cells formed from such electrodes in a series with one another, it is possible to thereby construct a battery which is clamped together by means of bolts. Caulking or sealing materials are placed between the individual cells and form a zone for demarking the limits of the individual electrolytic chambers. From the high cost of production for such batteries it can be seen that the data relative to the ratio of the power output to the weight and volume of these batteries are very unfavorable.

There are also known to those in the art, under the name "Janus-Electrodes" U.S. 3,311,507, gas diffusion electrodes which have two working sides or surfaces. These electrodes commonly consist of an inner gas permeable layer, coarse pored working layers positioned on both sides of the inner gas permeable layer, and on the outer side of the working layers, fine pored cover layers which are in direct contact with the electrolyte employed in the cell in which the Janus electrode is being used. The advantage of these Janus electrodes is that they can be made of very thin construction, since they are not subject to pressure due to pressure differential between the pressure of the electrolyte and the gas pressure in the electrode as occurs in some other types of electrodes.

It is difficult, however, to supply the necessary operating materials and chemicals to these thin electrodes through the thin resin coatings that are used to enclose them. One attempt at solving this problem is the battery construction disclosed in German patent application No. V 28,464 VI b/21b, which corresponds to U.S. patent application Ser. No. 549,910 filed May 13, 1966, now U.S. Pat. No. 3,451,853. In the batteries constructed according to the teachings of this patent, these fragile electrodes were fastened to one another with a plurality of hollow plastic rivets which also served as supply conduits for the electrolytes and other fluid materials of operation used in such electrodes. The process for producing such batteries, however, is cumbersome and time consuming. Fluctuations in the amounts of pressure used in the process of fabricating such batteries, moreover, easily give rise to flaws and cracks in the electrodes, particularly at the points where the plastic rivets pass through the electrodes and fasten them together.

Those in the art, therefore, have been faced with the problem of placing gas diffusion electrodes in a compact battery without experiencing the disadvantages of the above described prior art devices.

SUMMARY OF THE INVENTION

The object of the present invention is to provide a new type of compact battery employing gas diffusion electrodes.

The essence of the present invention lies in providing an electrical device having a cast casing which houses a plurality of positive and negative gas diffusion electrodes which are compactly arranged in an alternating sequence of polarity and in such a way that all the electrodes of one or both, of the polarities have a portion of the edges of their surfaces which project beyond the edges of the surfaces of the electrodes of the opposite polarity. The cast casing has hollow canals or conduits therein for supplying operating materials to, and removing from, the electrodes, operating materials such as electrolyte, fuel, pressurizing gases and the like.

BRIEF DESCRIPTION OF THE DRAWINGS

FIG. 1 is a schematic diagram of an ordered arrangement of a set of simple electrodes, each of which has a pair of non-truncated corners which project beyond the surfaces of the truncated corners of the next adjacent electrodes.

FIG. 2 is a schematic diagram of an ordered arrangement of a set of compound electrodes each of which has a top or bottom edge which extends beyond the surface of the next adjacent electrode.

FIG. 3A is a front view of an anode having a dual set of inlets and outlets for hydrogen gas.

FIG. 3B is a front view of a cathode having a dual set of inlets and outlets for oxygen gas.

DESCRIPTION OF THE PREFERRED EMBODIMENTS

Figure 4:
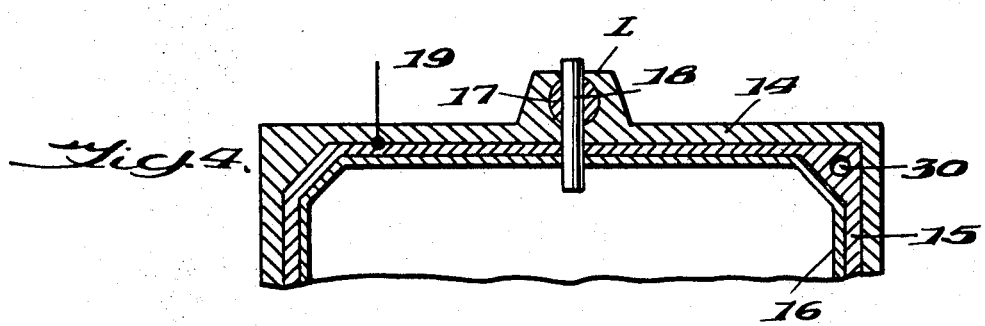
FIG. 4 is a partial vertical cross-sectional view of a section of a cast battery showing a removable tube in the casing.

The problems facing those in the art, as noted above, have been solved according to the present invention by novel cast batteries as described hereinafter. These cast batteries are formed with a casing of cast material and the casing has one side, and in some cases, two opposite sides, which are hollow. Within the casing, positive and negative electrodes are arranged in an alternating series of one type after the other in such a way that at least one type, and preferably both types, of such electrodes has one or more edges which extend beyond the surfaces of the other electrodes. That is, the extended edges of one type of electrodes have axial projections which lie outside the reach of the edges of the other type of electrodes.

In order to explain the new electrode arrangement more clearly, reference may be made to the use, in one embodiment of such new arrangement, of conventional rectangular-shaped Janus electrodes which are three dimensional electrodes having relatively narrow cross-sectional areas and relatively large side areas. To use rectangular hydrogen and oxygen Janus electrodes in such embodiment in the cast barriers of the present invention, two of the corners of each of the electrodes which lie diagonally opposite each other are truncated. This enables one to then lay a series of such truncated hydrogen and oxygen electrodes, one on top of the other, on their sides, in an alternating sequence of hydrogen electrode on oxygen electrode on hydrogen electrode, etc., in such a way as to provide an alternating sequence of truncated corner on non-truncated corner on truncated corner, etc. The non-truncated corner surfaces of one type of electrode are aligned with one another and they project beyond the surface areas of the truncated corners of the other type of, and next adjacent, electrodes which are also aligned with one another. In between the electrodes solvent soluble spacing elements or gaskets of appropriate shape are inserted, which will provide, after the casting of the battery and the removal of such solvent soluble spacing elements, void spaces for use as electrolyte chambers for the subsequent reception of electrolyte as well as supply conduits for the supplying of the electrolyte to such chambers. The electrode packet thus formed with the desired number of layers of alternating spacing elements, and hydrogen and oxygen electrodes, is then placed in a casting mold and cast, under light pressure, with the desired casting resins. After the casting resin has cured or hardened, the exterior of the cast object retains the contour of the casting mold, whereas between the electrodes within the cast electrode packet there remains the soluble spacing elements, after the removal of which as described below, there will be void spaces for the reception of the electrolytes and other fluids required for operating the electrodes.

In order to supply to the electrodes, or remove therefrom, gaseous materials, the cast electrode packet is also provided with a bored hole at each of the four corners of the electrode packet in such a fashion that one of the pairs of bored holes lying diagonally opposite each other pierces and services only the hydrogen electrodes and the other pair of such diagonally opposite bored holes only pierces and services the oxygen electrodes through the nontruncated corners of such electrodes. In this way the respective operating gases can be supplied to the hydrogen and oxygen electrodes through one of the nontruncated corners of the electrodes and the waste products can be removed from the diagonally opposite nontruncated corners of the electrodes. The bored holes pierce casting resin therein when they pass through the truncated corners of the electrodes rather than the electrodes.

The supply canals or conduits to the electrolyte chambers can also be formed, if necessary, by boring holes from the outside of the cast electrode pack. A preformed body made of a material which will not be wetted by the subsequently employed casting resin may also be used as a core in the casting. After the casting resin hardens these cores can then be removed from the cast packet of electrodes by being physically pulled out so as to provide the desired spaces for the electrolyte supply canals. The nonwettable preformed cores can be formed of materials such as fluorocarbon resins, including polytetrafluoroethylene, available under the trademark Teflon, and paraffinated metals which are prepared by coating dimensionally stable metallic substrates with thin coatings of paraffin waxes. For ease of removal from the cast electrode packets these removable cores are preferably conical in shape.

A further big advantage of the present invention relates to the use, as the spacing elements to be employed for demarking the electrolyte chambers between the electrodes, of solvent soluble spacing elements. These solvent soluble spacing elements can be formed of water soluble materials such as polyvinylalcohol. These soluble spacing elements may also, and preferably do, have portions thereof which extend beyond the adjacent electrodes so that upon the removal of the solvent soluble spacing element with solvent after the casting of the electrode pack the resulting void space between the electrodes can be used as inlet and outlet canals for the electrolyte. The solvent soluble spacing element should not be removed, of course, with a solvent which would have an adverse effect on the electrodes or the casting resin used to form the casing for the electrode pack. The use of solvent soluble core pieces and spacing elements in order to facilitate the formation of storage chambers or intersecting canals for the electrolyte is particularly advantages in the fabrication for the smaller sized cast batteries.

It has already been proposed in German patent applications Ser. Nos. S 96,870 VI b/12h and S 101,132 VI b/21b, which correspond, respectively, to U.S. patent applications Ser. No. 545,986 filed Apr. 28, 1966, now abandoned in the names of August Winsel and Ralf Windtland, and Ser. No. 603,311 filed Dec. 20, 1966 in the names of Ralf Windtland and August Winsel, to flush the inside of Janus electrodes having two working sides with fresh electrolyte solution in order to improve the process of removing heat from the electrodes, by creating a hydrostatic pressure differential between adjacent electrolyte chambers. In this procedure, it was necessary to alternatively arrange the electrolyte chambers in two groups. In order to accomplish this arrangement, a soluble spacing element was preferably used, which spacing element, however, was not congruent to the formation of the main electrolyte canal after the battery pack was put together. This arrangement was accomplished, for example, by inserting the spacing elements alternatingly in a mirror image fashion so as to thereby provide feeder or branch canals. By boring vertically or at right angles to the electrolyte chambers, these branch canals can be connected with one another in such a way that two electrolyte circulation systems are provided for the required and so-called dual circuit flushing of the electrodes, and which circulation systems are separate from one another.

Electrical contacts used for the feeding or removing of the electrons to and from the electrodes in the electrical devices of the present invention, and which provide leads either from the outside or the inside of the devices, can be cast in the corresponding electrical connections.

The incongruity of the shape of the electrodes used in the electrical devices of the present invention can preferably be brought about by turning every second electrode in each group of congruent types of electrodes. In this case the electrodes can be provided with separate gas conduits by boring directly into the electrodes, provided, however, that standardized equipment is used for the production of electrodes of different polarity.

The devices and processes of the present invention are not limited in application to fuel cell batteries. Other types of batteries, such as batteries for electrolyzers and other electrochemical cells, can also be produced using the concepts of the present invention. In particular, the concepts of the present invention can be used for the fabrication of electrolyzers in which water is electrolyzed in gas valve electrodes of the type disclosed in Austrian Pat. 218,093 which issued Dec. 15, 1959. In such gas valve electrodes provisions are made for the removal of the electrolysis gases from the electrodes for the purpose of avoiding occurrences of excess pressure.

It is to be noted that in many galvanic cells only one gas diffusion electrode is used. A methanol fuel cell, for example, consists of oxygen or air diffusion electrodes and methanol electrodes. Both of these types of electrodes generally employ, as catalysts, metals of the platinum group embedded in a porous carrier body. The methanol fuel is mixed with the alkaline electrolyte. Only one set of raw material supply and exhaust material removal conduits, therefore, is needed for the methanol electrodes. A cast battery made according to the present invention and employing such methanol electrodes therein, therefore, has a simpler structure than a cast battery made with hydrogen electrodes since there is no need in the methanol electrodes for a separate set of canals or conduits for the supplying or removing of hydrogen gas.

In the composite cast batteries made according to the present invention, the individual cells employed therein can be connected together in series as well as in parallel, depending on whether homopolar Janus or so-called compound electrodes are used therein.

The electrodes used by the applicants in preparing the cast batteries according to the present invention, may have two working sides. Such electrodes are formed from two or three layers of simple gas diffusion electrodes which are connected by means of a conducting or non-conducting support film or foil to form a multilayered compound electrode. These compound electrodes may be produced, therefore, by inserting a layer of synthetic resin between two simple electrodes of the type which have a plurality of inner layers and one working layer and then compressing the composite article together at elevated temperatures. The synthetic resin employed in such operation is one which will flow under such operating conditions into the pores of the layers of the simple electrodes adjacent thereto and thereby anchor itself to such electrodes upon the cooling of the resulting compacted composite articles. The resulting compound electrodes, therefore, are not subjected to membrane-like stresses from the electrode halves due to the necessary excess pressure of the operating gases. Electrodes of this type are disclosed in U.S. patent application S.N. 685,165 filed Nov. 22, 1967.

Individual cast batteries made according to the present invention can be joined together electrically and three dimensionally in order to provide units of even larger physical size and electrical capacity without the need for any interior modification of the individual batteries. It is expedient to have the orifices in the casings of the individual batteries for the supply and removal of the operating materials open or discharge into each other in two consistently defined levels which are parallel to each other. These openings can then be joined together from battery to battery from the outside thereof, for example, by being caulked together with the aid of round cord seals intermediately inserted in grooves provided therefor in appropriate juncture fittings placed in the openings in the casings. The grooves, openings and fittings can be so structured as to allow the cord seals to be readily compressed into a permanent position.

The novel concepts of the present invention may be further explained by reference to the drawings. Gas diffusion electrodes, such as hydrogen and oxygen electrodes, which are to be used in accordance with the teachings of the present invention have, as indicated above, surfaces which are, preferably, rectangular in shape. Although actually three dimensional in configuration, in FIG. 1, rectangular electrodes 1, 2 and 3 are merely shown in two dimensions. Electrodes 1 and 3 would be of one type, i.e., hydrogen or oxygen electrodes, with electrode 2 being of the other type. The electrodes would be thus arranged in an alternating sequence of polarity, one behind the other standing on their edges. When only these simple electrodes are used in forming a battery, of course, the same number of oxygen and hydrogen electrodes must be used with a working side of one type of such electrodes facing a working side of one of the other types of such electrodes. The space between the working sides, which is provided in various ways as disclosed herein, is utilized as an electrolyte chamber from which electrolyte is fed to the electrodes. One of the two pairs of corners of the surfaces of each electrode which lie diagonally across from each other is cut off so as to provide truncated electrodes for the purposes of the present invention. Electrode 1 thus has truncated corners $1i$ and $1ii$, electrode 2 has truncated corners $2i$ and $2ii$ and electrode 3 has truncated corners $3i$ and $3ii$. When the electrodes are stood on end and arranged as shown in FIG. 1 in the form of a four-cornered three dimensional composite, the nontruncated corners of the electrodes in each of the four corners project beyond the edges of the truncated corners of the electrodes in the same corners. The axial projections of all the nontruncated corners of one type of electrodes thus project outside the surface areas of all the truncated corners of the other type of electrode. All the electrodes should be of approximately the same surface area and all the truncated areas should be of approximately the same size, so that the nontruncated areas project beyond the truncated areas in a uniform manner, i.e., the truncated corners in each of the four corners should be aligned with each other and be generally of the same dimensions.

The electrodes need not, of course, be rectangular in nature. The rectangular shape allows for the simplest mode of fabrication of the cast batteries of the present invention. Angular shaped electrodes having more or less than four corners, or even round electrodes, which would necessarily require more elaborate interior electrolyte circuits, can be employed if the intended utility warrants the need and expense therefore. The surfaces of the individual electrodes should preferably be flat in order to facilitate the formation of the composite batteries therewith, although, again, if the intended utility of the batteries warrants the need and the expense, electrodes having cured surfaces may also be used. The area which is cut off at the corners of the electrodes amounts to no more than about 0.5 to 5 square centimeters.

After the pair of opposite corners is cut off each of the electrodes, a sheet of layer of soluble packing material is laid on one side of each electrode to cover such side completely and the thus covered electrodes are stacked on top of each other so as to provide a sandwich type construction of alternate layers of hydrogen electrode-soluble packing-oxygen electrode-packing, etc. A layer of packing or a coverplate is placed at the bottom and top layers of the sandwich construction. Both the oxygen and hydrogen electrodes should have approximately the same surface dimersions to facilitate the construction of the cast battery. The two types of electrodes need not have the same thickness. The oxygen and hydrogen electrodes are also stacked in the sandwich structure in such a way that the two truncated corners of each of the oxygen electrodes are aligned with the two truncated corners of each of the oxygen electrodes stacked above and below, and the same alignment of truncated corners is also employed in stacking the hydrogen electrodes as shown in FIG. 1. The resulting stacked electrode pack is then placed in a casting mold having the necessary configurations and the casting operation is preferably conducted by charging the casting resin into the mold so as to allow it to fill the mold from the bottom up so as to allow any air that is present to readily escape out of the top of the mold.

In order to provide for the supplying to, and removal from, the cast battery of the electrolyte, slits or other appropriately placed openings must be present in the packing layers, after the cast battery is prepared. These openings can be provided by using a water soluble material in the packing layer at the place where the opening is desired and then dissolving such material out of the packing layer with water after the casting operation. Insoluble plastic or metal cores on dams can also be used for this purpose, whereby, after the casting operation, such dams are physically removed by being pulled out to provide the desired opening. These canals or slits may be 0.5 to 4 cm. long and may have cross-sectional areas of 0.01 to 0.5 cm.$^2$, and preferably 0.02 to 0.2 cm.$^2$.

The supply of operating gas to the electrodes is accomplished in the device shown in FIG. 1 through holes provided therefor in nontruncated corners of the electrodes. Each of the electrodes, 1, 2, and 3, shown in FIG. 1 has one pair of corners, which lie diagonally opposite each other, and which are truncated. It can be readily appreciated that when these rectangular truncated electrodes are stood on end as shown in FIG. 1, there are only two possible positions, i.e., in one, the pair of truncated corners is in the upper left and lower right corners, and in the other, the pair of truncated corners is in the upper right and lower left corners. The combination of electrodes depicted in perspective in FIG. 1 shows, in accordance with the present invention, that when a set of the two types of electrodes are so stacked together to form the composite battery that each set of truncated corners of, for example, the hydrogen electrodes, are all placed in one of the two possible positions, and each set of truncated corners of the oxygen electrodes are all placed in the other of the two possible positions. In any one of the four corners of the composite battery, therefore, there is a repetitive sequence of a truncated corner, or vice versa. After the casting of the composite battery all four corners of the battery are drilled with holes that pierce the casing and the electrode in such a way that the individual electrodes are only pierced in their nontruncated corners as shown by holes 1a and 1a' in electrode 1, holes 2a and 2a' in electrode 2 and holes 3a and 3a' in electrode 3. It is the uniform projection of the non-truncated corners that allows for the formation of the bored holes in this way. These bored holes are used as a means for allowing operating gases, or operating raw materials generally, to be passed into the individual electrodes from a source of supply outside the battery.

FIG. 2 shows an ordered arrangement of rectangular electrodes 7, 8, 9 and 10 according to the present invention. Electrodes 7, 8, 9 and 10 are also so arranged that a hydrogen side of one compound electrode faces an oxygen side of the next adjacent compound electrode, and vice versa. Thus, the projecting portions of the hydrogen and oxygen sides of one electrode project beyond the recessed portions of the oxygen and hydrogen sides, respectively of the next adjacent electrode.

In the larger sized electrodes the supply of operating gases to the electrodes through the corners thereof may, because of the larger amounts of gas needed in such electrodes, create problems. For such larger electrodes, therefore, alternate methods of supplying the gases are shown in FIGS. 3A and 3B wherein a dual set of bored supply and removal conduits is provided along the sides of the electrodes M and M' for each of the operating gases being employed. These gas supply and removal conduits would be in gas communication with the bored holes in the electrodes as shown in FIGS. 1 and 2. The dual supply and removal conduits in the electrodes could be inserted in the casings by boring holes in the casing after it is cast, or, by inserting appropriately shaped solvent soluble materials in desired positions in the casing while it is being cast, and then, after the casting and hardening of the casing, dissolving out such solvent soluble materials.

Because of the good conductibility of metal electrodes no additional means are needed to improve the conduction of the electric current in the electrode itself. The removal of the current from metal gas diffusion electrodes of about postcard size can be accomplished by spot welding to the electrode a silver wire having a diameter of about 1.5 millimeters as shown by wire 19 in FIG. 4. This spot welding technique also has the advantage, in contrast to the use of other welding or soldering processes, in that no corrosion of the solder, with an attendant increase in the resistance of the wire contact, occurs. For electrodes larger in size than postcards the wires which are used as the contacts must of course have larger diameters or, if necessary, a conducting plate having a plurality of contact points can be used as such contacts as illustrated by plates 12 and 13 in FIGS. 3A and 3B. Plate 12 has a group of three contact points S and plate 13 has six contact points T which are used as electrical leads to the electrodes in the casing. With carbon electrodes, which are used in hydrophilic form for the utilization of fuel-electrolyte mixtures therein, and which are used in hydrophobic form, and preferably with an inner gas permeable layer, for the utilization of gaseous operating materials therein, it is recommended that one insert metal grids therein for leading off the electrical current generated in such electrodes.

It has been shown in the past to be relatively simple to seal gas connections well although it is difficult to produce caustic conduit connections which are absolutely tightly sealed. It is also known, nevertheless, that electrodes can be sealed well by means of thin seals or gaskets if the outer diameter of the seal is between 10 and 15 mm. and the seals are uniformly compressed around the connection being sealed. This procedure may be used in the fabrication of an aggregate battery device by connecting two or more of the cast composite batteries together. For each of the composite battery blocks, therefore, a total of 4 gas lines and 2 electrolyte canals have to be sealed. For this purpose each battery block is provided with a lug or ear at the end of a main supply canal and the lug is provided with an annular groove in which a gasket or a thin seal is inserted. The connections from the next installed battery block are then fastened to these seals by means of span bolts so as to achieve the desired sealing of the connections between the two battery blocks.

During the construction of the cast batteries difficulties may be encountered due to the fact that the curing or hardening of the casting resin usually entails the generation of a certain amount of heat. This heat will cause the heating and expansion of air in the electrodes or in the areas between the electrodes. As a result, pockets of air will rise up through the casting resin or settle in various places in the casting, so that after the hardening of the cast battery, the cast resin will contain cavities. This problem can be solved, however, by inserting a flexible tube in the electrolyte exhaust canals, in such a way that the tube is so tightly inserted in the electrodes and in the packing layers that none of the casting resin can penetrate such canals while at the same time not being so tightly squeezed that the heated air cannot readily escape through such flexible tubes. This may be further explained with reference to FIG. 4, werein such a flexible tube 18 is shown. After the hardening of the resin in cast casing 14, tube 18 is removed so as to provide a functional electrolyte supply conduit from the exterior of the cast battery L into the various interconnected electrolyte chambers and conduits lying within the battery. After the removal of tube 18 electrolyte collection channels are formed by boring holes through the casing at the position shown at 17 in FIG. 4. The battery, moreover, can also be cast after first inserting into the stacked electrode pack a rigid hollow rod which contains a suitable sized bore opening through which the flexible tube can then be inserted into the packet. In removing these elements from the cast battery after the casting operation and the hardening of the casting, the flexible tube is removed first followed by the removal of the rigid rod. After the removal of the flexible tube, and the rigid rod, if the latter element is used, the holes thereby left in the casing and which are usually positioned over the main electrolyte supply conduit can be closed in a second casting operation.

In cast battery L shown in FIG. 4 silver wire 19 removes electricity from electrode 15 and other electrodes in the battery. Bore hole 30 through a nontruncated corner of cast electrode 15 provides access to such electrode for operating gas. Spacing element 16 acts as a spacing means.

As it is generally known, because of differences in potential, electrical leakage currents flow between cells which are connected electrically in series and which have a common supply of electrolyte. The amount of these leakage currents depends on the value of $R_2$ and $R_1$ and on the numerical ratio $R_2/R_1$, wherein $R_2$ represents the electrolyte resistance of the main supply conduit and $R_1$ represents the electrolyte resistance of the smaller intersecting canals in one of the cells. The higher is $R_1$ and the lower is the numerical ratio $R_2/R_1$, the lower is the total amount of electrical current leakage in the battery and, thus, the lower is the loss of efficiency of the battery.

Figure 5:
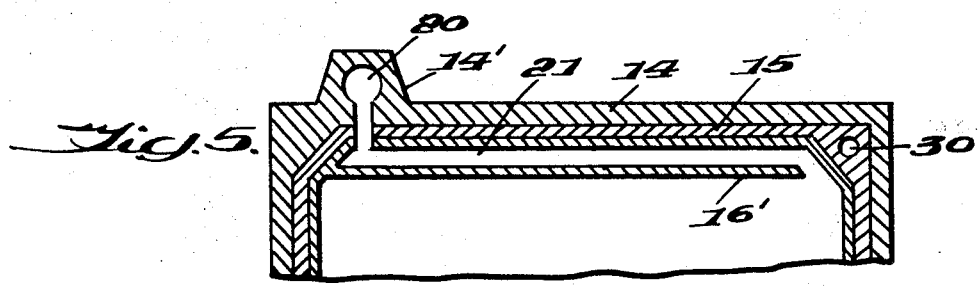
FIG. 5 is a partial vertical cross-sectional view of a section of a cast battery showing a type of branch electrolyte canal therein.
Figure 6:
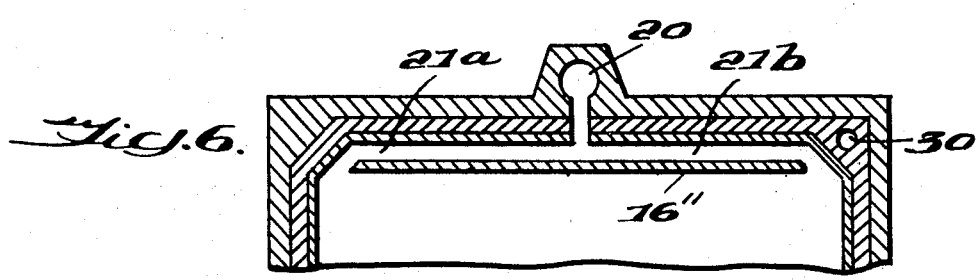
FIG. 6 is a partial vertical cross-sectional view of a section of a cast battery showing a second type of branch electrolyte canal therein.

$R_2$ is determined from the size of the cross-section A of the main supply conduit and the spacing $d_2$ between the electrodes by the equation:

$$R_2 = \frac{d_2}{\mathcal{H} \cdot A}$$

wherein $\mathcal{H}$ is the specific value of the conductivity of the electrolyte. $R_1$ should be as large as possible. There are two possible ways to readily increase the value of $R_1$ using simple means. For batteries which are not to be used in inclined positions, that is, which are only used on level surfaces, the battery construction shown in FIG. 5 can be employed, wherein the electrolyte flows from main supply conduit 20 located in ridge 14' of casing 14 over the elongated branch canal 21 in spacing element 16' to the cell or is also pushed in the opposite direction when canal 21 is used as an electrolyte removal conduit. For batteries, which, however, must be operated in an inclined position, the battery construction shown in FIG. 6 is used to advantage. In this case, however, by partitioning canal 21 in spacing element 16" into sections 21a and 21b, one does not obtain the same electrolyte electrical resistance value as is provided by the construction of FIG. 5. The electrolyte resistance value in the construction of FIG. 6 is a quarter of the corresponding value for the construction of FIG. 5.

Figure 7:
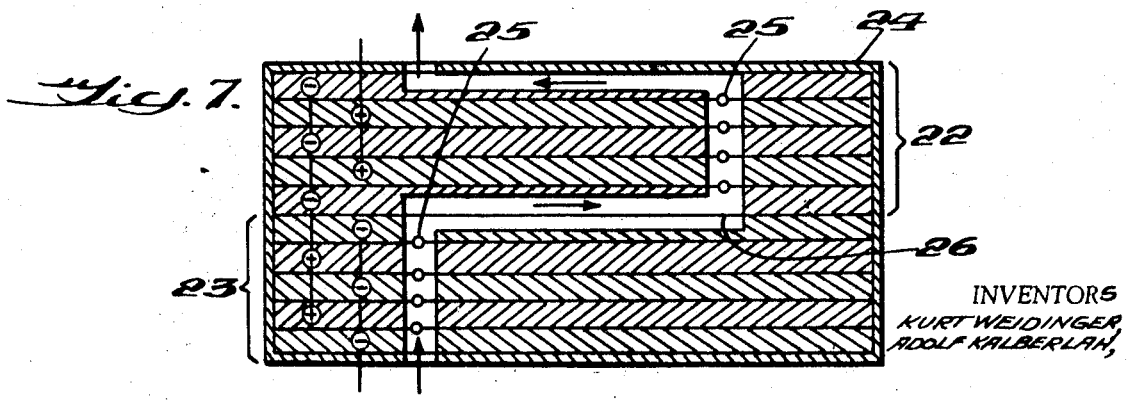
FIG. 7 is a partial horizontal cross-sectional view of a cast battery made from two groups of cells.

If a plurality of cells are connected together electrically in parallel in a group of cells to achieve units of larger capacity, and if several of such groups of cells are then connected together electrically in series, then provisions must be made so that the electrolyte electrical resistance is made as large as possible between each pair of the series connected groups of cells. This can be accomplished by increasing the electrical resistance of the electrolyte in the main supply conduit. One possible way of accomplishing this is shown in FIG. 7 which discloses a top or plan view of a composite cast battery 24 formed from two such groups of cells, 22 and 23, which are connected in series. In this arrangement main supply conduit 26 supplies electrolyte to the entire battery 24, and by means of branch conduits 25 which penetrate into electrolyte supply chambers located between the electrodes, the electrolyte is, in turn, supplied to the individual cells in each cell group.

Figure 8:
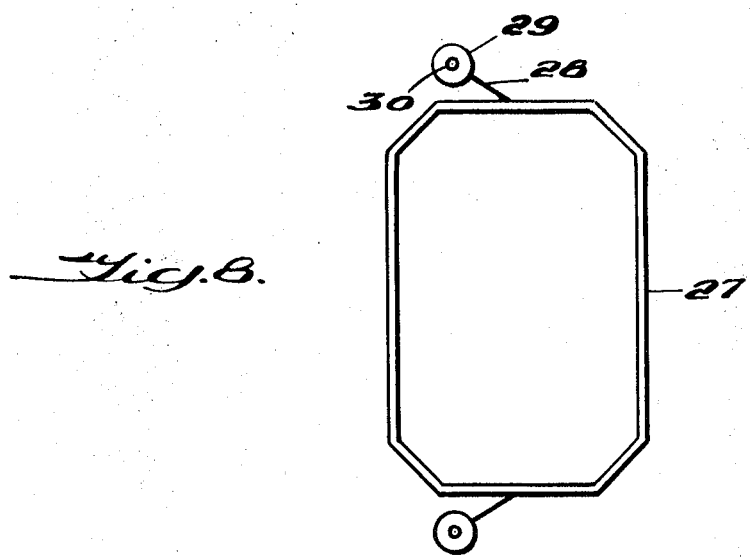
FIG. 8 is a front view of a spacing element or gasket.

FIG. 8 depicts a type of spacing element of gasket 27 which can be used to separate the electrodes from each other in the cast composite battery if the battery is to contain two electrolyte circulation systems, as for example, one such system for circulating electrolyte which has a lower pressure and a second system for circulating electrolyte which is under a higher pressure in order to transport the reaction heat out of the battery. A dual circulation system of this type is disclosed in U.S. patent application 603,311, filed Dec. 20, 1966. Gasket 27 is preferably produced from soluble materials such as polyvinylalcohol and may be made in an injection molding process and it has a continuous ribbon shaped configuration which is about 2 mm. wide and about 1 mm. thick. Connecting elements 28 have the same configuration. Connecting elements 28 are also made of the same type soluble materials and they connect gasket 27 with discs 29 which contain a centrally positioned opening or eye 30 therein. By folding over every second gasket during the stacking of the electrodes and gaskets in the proposed composite battery it is possible to form two independent electrolyte circulation systems.

Figure 9:
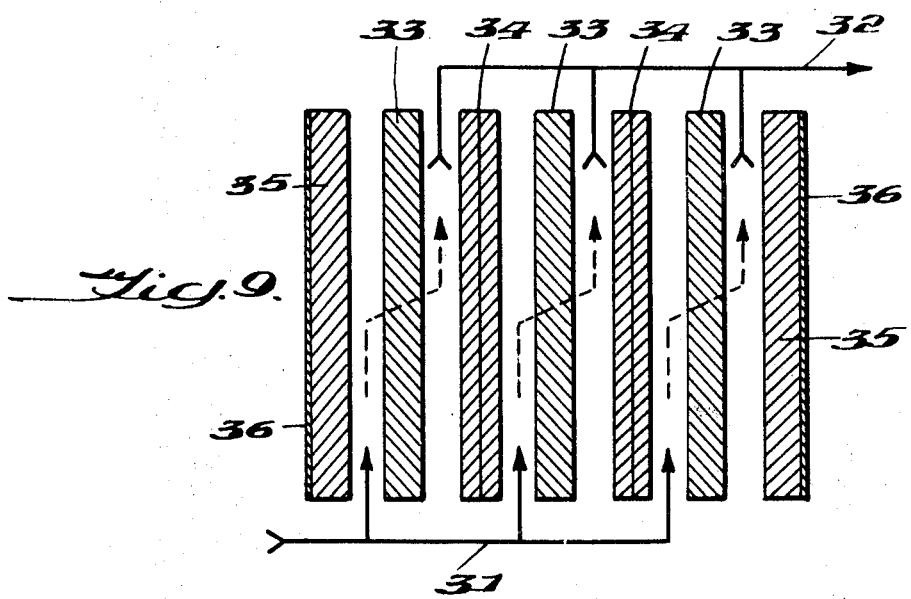
FIG. 9 is a partial cross-sectional view of an arrangement of simple and compound electrodes showing the circulation of electrolyte therethrough.

FIG. 9 depicts an arrangement of electrodes which may be used, in accordance with the present invention, to advantage in smaller sized battery units since it readily provides favorable operating temperatures. The electrolyte is supplied to the electrodes through line 31 and removed from the electrodes over line 32. In the electrode arrangement shown, end plates 36 are adjacent simple oxygen electrodes 35. Hydrogen gas diffusion electrodes 33 and compound oxygen electrodes 34 comprise the remainder of the electrodes. The use of a flow of alkali liquor as the electrolyte through the hydrogen gas diffusion electrodes 33 prevents the formation of a concentration polarization in the electrodes and leads to a uniform distribution of the heat in the battery.

The following examples are merely illustrations of the concepts of the present invention and are not intended as a limitation upon the scope thereof.

EXAMPLE 1

A composite fuel cell battery block consisting of 18 individual cells connected electrically in parallel was cast in 20 epoxy resin. The casting operation was conducted in an mold held at 20–25° C. for 4 hours without pressure. Each of the cells contained a set of hydrogen and oxygen Janus electrodes, each of which electrodes measured 116 mm. x 164 mm. x 3 mm. and had five layers, two outer fine pored layers, two intermediate coarse power layers and a single center working layer. The 36 electrodes each had a pair of diagonally opposite corners cut off. Each of the areas which was cut off amounted to about 200 mm.² The 36 electrodes were stacked in the alternate, uniform fashion shown in FIG. 1, i.e., an oxygen electrode with truncated corners in the upper right and lower left corners was followed by a hydrogen electrode with truncated corners in the lower right and upper left corners, and so forth. Each of the electrodes was separated from the next adjacent electrode by a spacing ring of polyvinyl alcohol packing which was one millimeter thick. The packing did not protrude beyond the edges of the four sides of the electrodes, nor did it protruded beyond the edges of the truncated corners of the electrodes. There was no packing placed between the edges of the electrodes and the epoxy resin coating or between such coating and the two outermost sides of the stacked electrodes facing such coating. The electrodes and packing layers were compactly arranged, i.e., they were all fitted close together so as to prevent the seepage of casting resin therebetween during the casting operation.

After the casting operation, the cast battery was cooled to room temperature. Holes were then bored through the epoxy casting so as to reach the packing between the electrodes and hot water was circulated through the holes and the packing layers so as to dissolve all the polyvinylalcohol packing in the battery pack and remove it therefrom.

Four new sets of holes were then bored through both sides of the casing and all the electrodes lying in between in such a way that one set of holes pierced all the nontruncated corners lying in the upper left corners of the electrodes, a second set pierced all the nontruncated corners lying in the lower right corner of the electrodes, a third set pierced all the nontruncated corners lying in the upper right corners of the electrodes, and the fourth set pierced all the nontruncated corners lying in the lower left corners of the electrodes. The holes were about six millimeters in diameter. Each of the electrodes was thus pierced by only two sets of the holes which were used as operating gas ingress and exit means. All of the oxygen as well as all of the hydrogen, electrodes, therefore, had mutually usable means for the supply thereto, and removal therefrom, of oxygen and hydrogen gas, respectively.

The epoxy resin casing had an average thickness of about 3.2 millimeters. The composite cast battery had outside dimensions of 122 mm. x 200 mm. x 70 mm. When hydrogen and oxygen gas were supplied to the composite battery so as to maintain a gas pressure of one atmosphere excess pressure on the hydrogen and oxygen sides of the electrodes the composite battery supplied, at an operating temperature of 60° C. and while using 6 n KOH as an electrolyte therein, an electric power of 250 w. for short periods of continuous operation, i.e., up to about 0.25 hour, and a power of 100 w. for more prolonged periods of continuous operation.

EXAMPLE 2

A composite battery having an arrangement of electrodes as disclosed in FIG. 2 was prepared as disclosed generally in Example 1 except that there was no need to truncate the corners of any of the electrodes in this example. This battery was formed from seven individual electrodes. Each of the cells was formed from rectangular shaped compound electrodes having two hydrogen and two oxygen sides. The packing used to separate the cells from each other during the casting operation was a 1.1 mm. thick spacing ring of an electrically nonconducting type of polyvinylalcohol. The polyvinylalcohol was dissolved out of the cast battery with hot 3 n KOH after the casting operation. Each of the compound electrodes measured 116 mm. x 164 mm. x 4 mm. The compact uncast block of electrodes with packing layers measured 116 mm. x 164 mm. x 32.2 mm. The casting was conducted at 26–27° C. for 3.2 hours without pressure. The resulting cast battery has outside dimensions of 121 mm. x 190 mm. x 37 mm.

Using the same operating conditions as were employed for the cast battery of Example 2, the battery of this example provided a power of 50 w. for short periods, i.e., up to 12 minutes at most, and a power of 20 w. for more prolonged periods of continuous operation.

EXAMPLE 3

A composite battery was prepared as generally disclosed in Example 1 in accordance with the present invention using the electrode arrangement shown in FIG. 1. This battery was formed from eight individual cells which were all connected electrically in series. Each of these cells was formed from rectangular shaped compound electrodes of the bipolar type construction. Each of these compound electrodes was formed from a simple three layer hydrogen electrode and a simple three layer oxygen electrode. These simple three layer electrodes each had an inner coarse pored working layer and two outer fine pored layers. The individual simple electrodes were separated from each other in the compound electrode by an electrically conductive, gas impermeable layer of polyethylene resin. The packing used to separate the cells from each other during the casting operation was a 1.0 mm. thick spacing element made of polyvinylalcohol. This spacing element was dissolved out of the cast battery with hot water after hardening of the casting. Each of the compound electrodes measured 116 mm. x 164 mm. x 4 mm. The uncast block of electrodes with packing layers measured 116 mm. x 164 mm. x 45 mm. The casting resin employed was epoxy resin. The casting was conducted at 23° C. for 4 hours. The resulting cast battery block has outside dimensions of 121 mm. x 200 mm. x 55 mm.

Using the same operating conditions as were employed for the cast battery of Example 1, the battery of this example provided a power of 125 w. for short periods of continuous operation.

EXAMPLE 4

A pressure electrolyzer was prepared generally as disclosed in Example 1 in accordance with the present invention using the electrode arrangement shown in FIG. 1. The electrolyzer was formed from eight individual cells which were all connected electrically in series. Each of the cells was formed from rectangular shaped Janus electrodes of the bipolar type construction described above in Example 3. The spacing element used to separate the cells from each other during the casting operation was one mm. thick and made of polyvinylalcohol. These elements were dissolved out of the cast electrolyzer with hot water after the casting operation. Each of the electrodes measured 116 mm. x 164 mm. x 4 mm. The uncast block of electrodes with packing layers measured 116 mm. x 164 mm. x 80 mm. The casting resin employed was epoxy resin. The casting was conducted at 25° C. for 3.75 hours. The resulting cast electrolyzer had outside dimensions of 122 mm. x 200 mm. x 110 mm. With an input power of 600 w. the electrolyzer produced 110 normal liters per hour of very pure hydrogen and 50 normal liters per hour of very pure oxygen when operated at 40° C. with six normal KOH used as the source of the hydrogen and oxygen.

Composite batteries, electrolyzers and other electrical devices made according to the process of the present invention provide simple means for the supply and removal of the operating materials to and from such devices. The casting resin employed for the casting operation, of course, must be one which will have physical and chemical properties that will be compatible with the intended use of the device. The resin, for example, should be chemically compatible with the electrochemical processes conducted within the device. The resin should also be physically compatible with the internal and external operating conditions, i.e., temperature, pressure, etc., to which the devices will be subjected. In addition to epoxy resins, other resins may be employed such as polyurethane and the methacrylate resins. The casting resin employed must be one which will not require the use of casting conditions, i.e., temperature and pressure, that would adversely affect the physical, chemical or electrical properties of the electrodes. In order to compensate as much as possible for extensive shrinkage which these resins may otherwise undergo, particularly the methacrylate resins, during the curing process, it is preferable in many cases to use fillers in the resins which are also chemically and physically compatible with the intended usage of the cast devices. Metal oxide powders have an advantage as such fillers in that they can be added in amounts which are readily determinable and which will easily counteract the tendency of the cast resin to shrink. The metal oxide powders which may be used in this regard are materials such as MgO and $Al_2O_3$. Other fillers which may be used are electrically nonconductive materials such as quartz powder.

The cast devices of the present invention provide a solution to the peculiar problem relating to the need for structural support, in a battery, for electrodes employed therein which have two working sides. The cast casing provided by the process of the present invention provides such support while at the same time retaining very good mechanical properties by reason of the almost complete absence of borings that traverse the entire width or length of the composite block.

It is also to be noted that the cast batteries of the present invention are suitable not only for electromechanical purposes. In special cases they have also proved useful for the production of gases, notably hydrogen and oxygen. For such purposes, chemicals, such as hydrogen peroxide, hydrazine and alkali metal borohydrides, in solution form, can be catalytically decomposed to provide such gases in or on electrodes installed in batteries in accordance with the present invention.

The oxygen electrodes used in Examples 1–3 contained silver as the catalyst in the coarse pored working layers. The hydrogen electrodes used in Examples 1–4 employed Raney-nickel as the catalyst in the coarse pored working layers of such electrodes. The oxygen electrode used in Example 4 employed Raney-nickel as the catalyst. The device of Example 4 may also be used with methanol as a fuel. Four mols of methanol would be mixed with, and supplied to the electrodes with each mol of the 6 N KOH. The methanol electrode in such case could be a carbonyl nickel support impregnated with a platinum/palladium catalyst. In special cases it has proven expedient to make the two fine pored cover layers for these methanol electrodes out of copper.

We claim:

1. An electrical device comprising a plurality of positive and negative polarity catalytically active, Janus-type, electrodes positioned face to face alternately and having electrolyte chambers between adjacent electrodes, each electrode of the same polarity including a portion projecting beyond the edge of all of the electrodes of the other polarity, each of said projections on the electrodes of each polarity lying in a line with a projection on each of the other electrodes of the same polarity, a unitary casing of molded material enclosing all of said electrodes, the projecting portions of said electrodes being embedded in the molded material of said casing, passages bored through all said projections lying in lines and through the molded material in which said projections are embedded to provide passages connection to all of the electrodes of each polarity, and additional passage means in said molded material to provide for supply and removal of electrolyte to said electrolyte chambers.

2. An electrical device as in claim 1 in which the positive and negative electrodes all have the same size and shape.
3. An electrical device as in claim 2 in which the positive and negative electrodes are rectangular in shape.
4. An electrical device as in claim 3 in which each of the electrodes has one pair of diagonally opposite truncated corners and a second pair of diagonally opposite nontruncated corners.
5. An electrical device as in claim 1 in which the nontruncated corners are the projecting surfaces and the truncated corners are the recessed surfaces.
6. An electrical device as in claim 5, said bores in the casing and nontruncated corners of the electrodes providing operating gas circulation means to and from said device.
7. An electrical device as in claim 1 in which said electrodes are connected in series.
8. An electrical device as in claim 1 in which said electrodes are connected in parallel.
9. An electrical device as in claim 1 which is a battery.
10. An electrical device as in claim 1 which is an electrolyzer.
11. An electrical device as in claim 1 in which at least some of the electrodes are gas diffusion electrodes having two working surfaces.
12. An electrical device as in claim 1 in which at least some of the electrodes are compound gas diffusion electrodes.
13. An electrical device as in claim 1 in which said casing is formed from a synthetic resin.
14. A device as in claim 6 having dual gas circulation means for each operating gas.
15. A device as in claim 1 having dual electrolyte circulation means.
16. A device as in claim 11 in which at least some of said electrodes have fine pored cover layers.

References Cited

UNITED STATES PATENTS

| | | | |
|---|---|---|---|
| 2,969,315 | 1/1961 | Bacon | 136—86 |
| 3,012,086 | 12/1961 | Vahlduck | 136—86 |
| 3,126,302 | 3/1964 | Drushella | 136—86 |
| 3,442,714 | 5/1969 | Matsuno | 136—86 |

WINSTON A. DOUGLAS, Primary Examiner

H. A. FEELEY, Assistant Examiner

U.S. Cl. X.R.

204—256, 270; 136—86